United States Patent
Montgomery, Jr.

[11] 3,922,019
[45] Nov. 25, 1975

[54] DIVERTER VALVES

[76] Inventor: W. T. S. Montgomery, Jr., c/o Montgomery Industries Int'l, P.O. Box 3687, Jacksonville, Fla. 32206

[22] Filed: Nov. 30, 1973

[21] Appl. No.: 420,583

[52] U.S. Cl. .................. 302/28; 137/610; 243/31
[51] Int. Cl.² ...................................... B65G 53/56
[58] Field of Search .......... 243/1, 5, 29, 30, 31, 38; 137/609, 610, 612; 251/298; 302/27, 28; 193/14, 23, 29, 31

[56] References Cited
UNITED STATES PATENTS

| | | | |
|---|---|---|---|
| 3,116,503 | 1/1964 | Bagwell | 137/610 X |
| 3,174,806 | 3/1965 | Barber et al. | 137/610 X |
| 3,281,093 | 10/1966 | Barber | 243/29 |
| 3,762,664 | 10/1973 | Loveless | 243/31 |

FOREIGN PATENTS OR APPLICATIONS

| | | | |
|---|---|---|---|
| 478,807 | 1/1938 | United Kingdom | 243/29 |
| 1,155,854 | 6/1969 | United Kingdom | 243/31 |

*Primary Examiner*—Richard A. Schacher
*Assistant Examiner*—James L. Rowland
*Attorney, Agent, or Firm*—Strauch, Nolan, Neale, Nies & Kurz

[57] ABSTRACT

A diverter valve for a pneumatic transport system, comprises a sealed housing having an opening in one side and two openings in an opposite side and a valve tube is pivoted in the housing and flexibly connected at one end to the housing at the one opening. A hydraulic motor is connected to swing the valve tube between positions for connecting its other end to one or the other of the opposite openings, and another hydraulic motor shifts the tube longitudinally into sealing engagement with the selected opening in either position. The material being transported passes through the housing without encountering internal regions that may retard passage.

11 Claims, 8 Drawing Figures

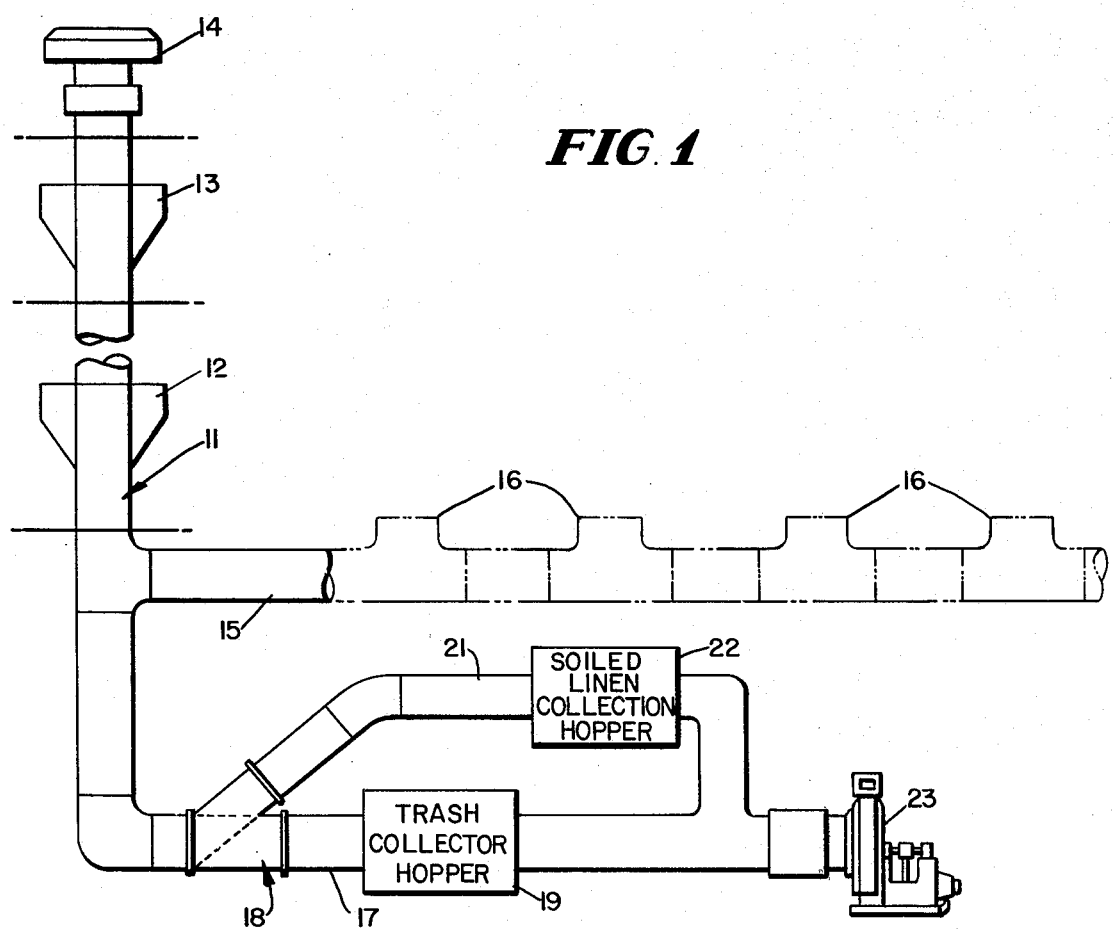
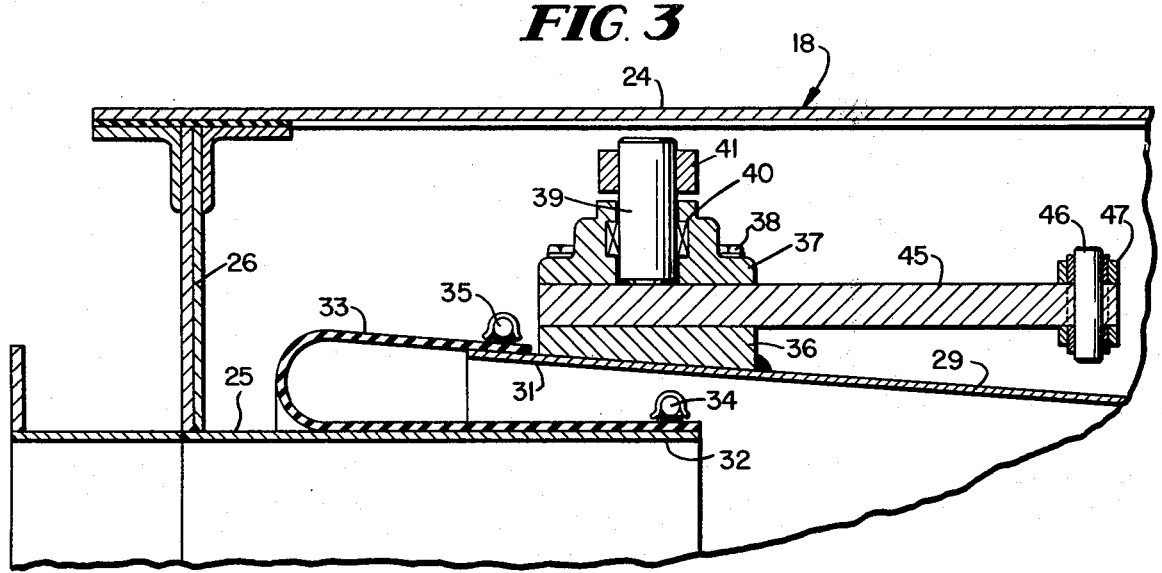

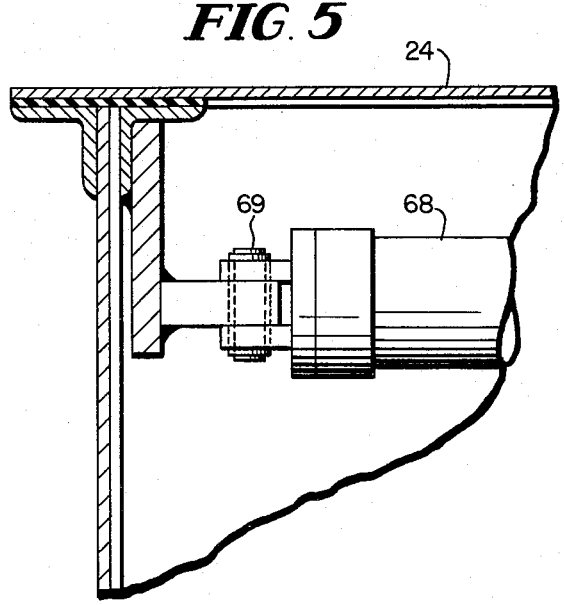
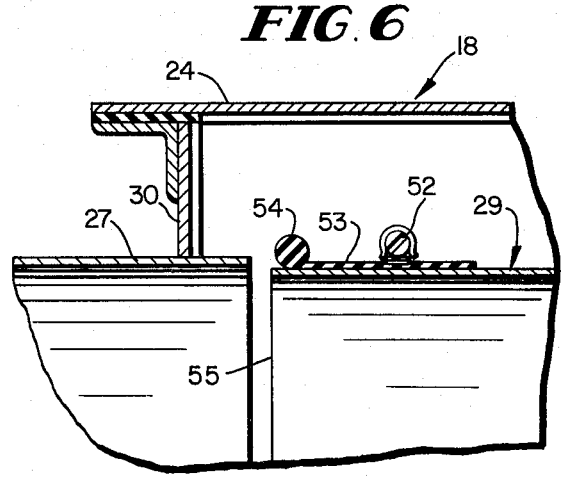
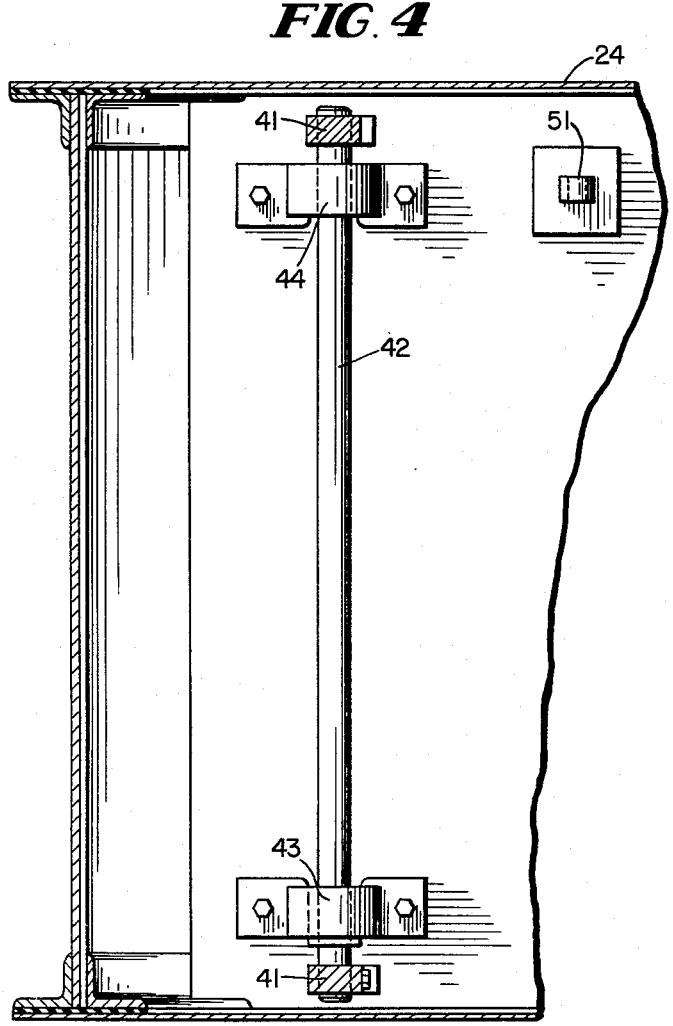
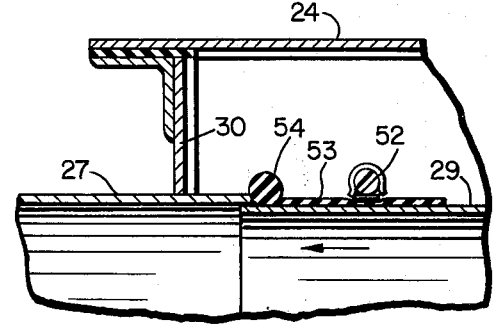
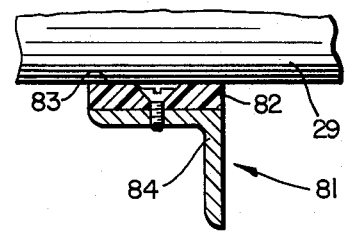

DIVERTER VALVES

This invention relates to diverter valves for pneumatic transport systems and is particularly directed to special valves capable of being introduced at selected points along the pneumatic path and control arrangements therefor.

In large buildings such as apartments, public offices and hospitals there is an increasing need for rapid and efficient disposal of soiled linen, trash and the like to prevent it from accumulating at multiple stations for periodic pickup operations. It has been proposed to provide pneumatic transport systems built into such buildings whereby material may be introduced at spaced points and selectively collected at one or more stations for incineration, removal for cleaning in the case of soiled linen for example, and other disposal.

In the preferred embodiment of the present invention an efficient reliable single pneumatic transport system is adapted for the collection of different materials destined for different disposal or treatment. For example in a hospital it may be desired on the one hand to collect containers, discarded dressings and other finally disposable items and discharge the same in bulk into a disintegrator or an incinerator or both, and on the other hand to collect soiled linen, uniforms and the like for delivery to a laundry or other recovery station. The invention provides in a single system of this type a novel diverter valve of special construction which is selectively operable without adverse effect upon other components in the system to channel material introduced into the system into free flow paths to different collector units, and this is a major object.

Diverter valves in pneumatic systems of general application have been proposed wherein a tube pivoted at one end near an inlet may be moved to connect its other end to one of several outlets for diverting materials into selected paths. While these diverter valve arrangements are quite satisfactory for transporting certain materials under certain conditions they cannot be used in pneumatic systems wherein it is desired to maintain the system vacuum or positive pressure to maintain operability of other components of the system.

Other pneumatic system diverter valves have been proposed wherein an internal blade is swingable to divert material from a single housing opening to one of two outlet openings. These valves, besides being difficult to seal against leakage of air, are not satisfactory for the high speed transport of materials which may become wedged between the blade and the housing.

It is therefore an extremely important object of the invention to provide a novel diverter valve structure for a pneumatic transport system that is capable of adjustment to convey material therethrough in any of a selected number of paths and provides for free passage of material without encountering regions that would substantially impede movement of the material.

It further is of particular merit and a very important object of the invention to provide for use in a pneumatic transport system a diverter valve of such novel structure that it freely passes material therethrough in any adjusted path position without the loss of system vacuum or positive pressure.

A further object of the invention is to provide a novel diverter valve wherein a valve tube, flexibly connected at one end to an opening in a relatively pressure tight housing, which opening may be an inlet or outlet, is swingably operable to connect its other end to one of two or more other openings which correspondingly may be outlet or inlet openings.

Another object of the invention is to provide a novel diverter valve structure wherein a valve tube flexibly connected to an opening (inlet or outlet) at one end is mounted for controlled swingable movement in a plane parallel to its axis and for longitudinal movement along its axis. Further to this object the invention contemplates novel power operated mechanisms for effecting these movements as well as novel controls for such mechanisms.

A further object of the invention is to provide a novel diverter valve structure wherein a valve tube is sealingly connected to a housing around a material passage opening by a flexible annulus permitting both pivotal and longitudinal shift of the tube.

Another object of the invention is to provide in a diverter valve novel fluid pressure sealing arrangements at opposite ends of a movable valve tube.

Further objects will appear as the description proceeds in connection with the appended claims and the annexed drawings.

BRIEF DESCRIPTION OF DRAWINGS

FIG. 1 is a relatively diagrammatic side elevation illustrating a material conveyor system embodying the invention according to a preferred environment;

FIG. 3 is an enlarged fragmentary view in section substantially on line 3—3 of FIG. 2 showing actuator mechanism for swinging the movable valve tube, and also showing the seal at the normally inlet end of the tube;

FIG. 4 is an enlarged fragmentary view in section substantially on line 4—4 of FIG. 2 showing the valve tube pivot;

FIG. 5 is a section substantially on line 5—5 in FIG. 2 showing mounting of the longitudinal shift motor for the valve tube;

FIG. 6 is a section substantially on line 6—6 in FIG. 2 showing the seal at the normally outlet end of the valve tube;

FIG. 7 is a section like FIG. 6 showing the final shifted position of the valve tube in operation; and FIG. 8 is a section substantially on line 8—8 in FIG. 2 illustrating the horizontal guide for the valve tube.

PREFERRED EMBODIMENTS

Figure 2:
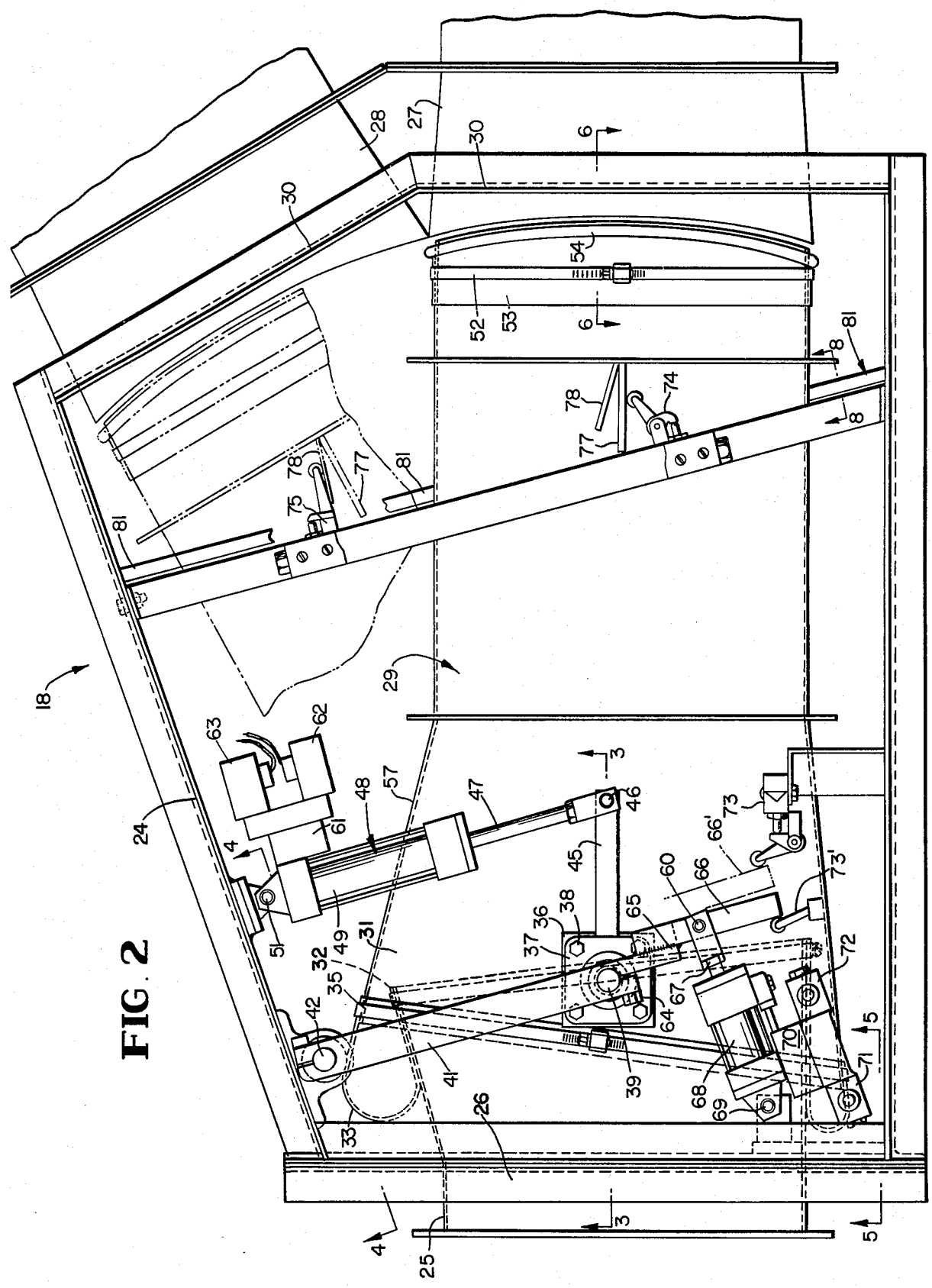
FIG. 2 is an enlarged plan view showing the diverter valve assembly in some detail.

FIG. 1 shows a pneumatic transport system wherein the diverter valve of the invention is employed. A closed conduit arrangement comprises a vertical tube assembly 11 having openable door loading stations 12 and 13 at different floor levels in a building and terminating above roof level in a normally closed damper device 14. At any level the vertical tube assembly 11 may be joined to one or more horizontal side tubes 15, each connected at 16 for example to one or more further vertical tube assemblies like the upper end of tube assembly 11, which further vertical tube assemblies may be in the same or different buildings.

The lower end of tube assembly 11 is connected to one end of a horizontal base tube assembly 17 containing a diverter valve unit 18 according to the invention.

Valve unit 18 may be normally connected to deliver material into a first collector unit 19, but as will appear it may be adjusted to divert material into a bypass tube assembly 21 containing a second collector unit 22. These tube assemblies 17 and 21 are rejoined at the inlet of a suitable vacuum pump unit 23 that maintains a constant negative pressure in the entire transport system.

Thus material deposited in the system at loading points such as 12 and 13 will be conveyed by gravity and vacuum to the particular collector unit 19 or 22 that may be selectively connected to the diverter valve unit 18.

FIGS. 2–8 illustrate a preferred form of diverter valve unit 18. This unit is mounted on a sheet metal valve housing 24 that is closed except for a tubular inlet member 25 fixed in one housing end wall 26 (FIGS. 2 and 3), and two tubular outlet members 27 and 28 fixed in the opposite housing end wall 30. The inlet and outlet members 25, 27 and 28 are mounted in pressure tight relation on the housing so that the housing is pressure tight during path adjustment as will appear. Preferably members 25, 27 and 28 are of sheet metal and about the same diameter, and each has an open end section disposed within the valve housing inwardly of the associated end wall 26 or 30. For purposes of disclosure the opening at 25 will be called the inlet and the openings at 27 and 28 will be called the outlet but it will be understood that the valve is reversible so that the opening at 25 may be the outlet. Also the preferred system is disclosed as maintained under vacuum but it will be understood that the invention in many phases is applicable to positive pressure systems.

Pivotally mounted within valve housing 24 is a sheet metal valve tube 29 that in the disclosed embodiment is adapted to be selectively disposed to connect inlet member 25 in communication with one or the other of the outlet members 27 and 28, with substantially pressure tight connections at each end. As illustrated by FIGS. 2 and 3, one end 31 of valve tube 29 extends in surrounding spaced relation over the relatively fixed annular inner end 32 of inlet member 25, and a continuous flexible pressure tight seal element 33 in the form of an annular band of synthetic rubber interconnects these ends. As shown in FIG. 3 seal element 33 is a normally flat circular band of synthetic rubber having one end secured as by ring clamp 34 around the external surface of inlet member 25 and having its other end reversely bent to extend over the adjacent end of valve tube 29 and be externally secured thereupon by ring clamp 35. The dimensions and disposition of seal element 33 are such that it freely permits relative rocking and necessary longitudinal displacement movements between inlet member 25 and valve tube 29 for a purpose to appear.

Adjacent its left end as shown in FIG. 3 valve tube 29 is provided with two diametrically opposite rigid external projections 36 which may be blocks welded thereon, and caps 37 are secured on the projections 36 as by bolts 38. A pivot pin 39 is rotatably mounted in each cap as by a bearing 40, the aligned axes of pins 39 being in a diametrical plane containing the longitudinal axis of valve tube 29. A pair of similar parallel arms 41 have their inner ends secured upon pins 39 and their outer ends fixed upon the opposite ends of a supporting pivot rod 42 journalled on a fixed axis in bearings 43 and 44 (FIG. 4) within the housing. The pivot axes of pins 39 and rod 42 are parallel.

At least one of the projections 36 has secured fixedly thereto, as by the cap 37, one end of a lever 45 which (FIG. 2) has its other end pivoted at 46 to the reciprocable piston rod 47 of a pneumatic or hydraulic swing cylinder 48 having its casing 49 pivoted at 51 to the valve housing. Lever 45 is parallel to the longitudinal axis of tube 29.

At its other end valve tube 29 (See FIG. 6) has secured therearound as by ring clamp 52 a circular seal band 53 of synthetic rubber or the like terminating in a resilient bead 54. During operation after the valve tube 29 has been swung to the FIG. 2 angular position its free end indicated at 55 is spaced slightly from the edge of the coacting fixed outlet member 27.

Pneumatic cylinder 48 is preferably of the type wherein the piston is moved in opposite directions by air pressure. It is provided with a reversible valve 61 connected to a suitable source of air pressure (not shown) and controlled by a double solenoid unit 62, 63. When solenoid 62 is energized piston rod 47 is extended to the FIG. 2 position. When solenoid 63 is energized piston rod 47 is retracted and valve tube 29 is swung about pivot 39 to the dotted line bypass position of FIG. 2.

An arrangement is provided for longitudinally shifting the valve tube 29 in either angular position. The end of arm 41 that is fixed to pivot pin 39 is split and clamped upon the pin as by bolt 64, and one extended leg 65 of the arm has secured thereto a bar 66 pivotally connected at 60 to the reciprocable piston rod 67 of a pneumatic longitudinal shift cylinder 68 having its casing pivoted to the housing wall at 69. Cylinder 68 is also preferably of the type wherein the piston is moved in opposite directions by air pressure. It is provided with a reversible valve 70 connected to the air pressure source and controlled by a double solenoid unit 71, 72. When solenoid 71 is energized, piston rod 67 is retracted so that the valve tube will be located in either its full or dotted line positions of FIG. 2, and bar 66 engages and closes normally open switch 73' in the swing cylinder circuit. When solenoid 72 is energized, piston rod 67 is extended to shift the valve tube 29 toward the selected outlet opening and bar 66 releases switch 73' which reopens.

When the system is in operation with the diverter valve adjusted to pass material to collector unit 19, the valve tube 29 is angularly in the solid line position of FIG. 2 but is displaced to the right by cylinder 68 to engage the outlet in sealing relation as shown in FIG. 7. At this time solenoid 72 is energized and piston rod 67 is extended so that bar 66 disengages from switch 73' to permit it to open the circuit to solenoid unit 62, 63. When bar 66 has moved to its dotted line position shown at 66' it actuates a normally open microswitch 73 the function of which is to transmit a control signal to an automatic sequence control circuit (not shown) that tube 29 is properly seated on the outlet. Thus at this point the valve tube 29 is effectively prevented from swinging about its pivot 39 since solenoid 62, 63 is disabled and the valve tube is being pushed into telescopic fit with an outlet by the force of cylinder 68.

Should it be required to swing the valve tube 29 to the dotted line bypass position, it is necessary to energize solenoid 71 to retract piston rod 67 and thereby shift valve tube 29 longitudinally to the FIG. 2 position where bar 66 closes normally open microswitch 73' that is in the electrical control circuit of swing cylinder solenoids 62 and 63 and thereby condition solenoids 62 and 63 for selective actuation. In this longitudinal movement of tube 29, it pivots about pivot 42.

Operation of cylinder 68 is controlled to insure that it may shift the valve tube 29 to either of its longitudinal positions only when the valve tube is aligned with either outlet opening. This control may comprise a pair of normally open microswitches 74 and 75 connected in parallel in the energizing circuit for solenoids 71 and 72. When tube 29 is in the solid line position of FIG. 2, switch 75 remains open and switch 74 is closed by operating arm 77 fixed on the tube 29. Similarly when tube 29 is in the dotted line position of FIG. 2, switch 74 is open and switch 75 is closed by operating arm 78 fixed on the tube 29. Closure of either switch 74 or 75 conditions the electrical circuit of solenoids 71 and 72 to selectively operate longitudinal shift cylinder 68.

Within the housing the tube 29 is supported at one end by the arms 41 and the pivot on the housing. Adjacent its other end the tube rests on a linear bearing 81 which (See FIG. 8) may be a strip 82 of nylon, Teflon or like hard smooth synthetic plastic having a bearing surface 83 lying in a horizontal plane. Strip 82 is mounted on an angle iron or like rigid structural member 84 fixed to housing 24. Tube 29 rests in substantially line contact on surface 83 and is readily slidable therealong.

In summary as to operation, swing cylinder 48 may angularly shift valve tube 29 to one or the other of its operative material passage positions only when longitudinal shift cylinder 68 has retracted the tube longitudinally from sealing engagement with an outlet. Similarly the shift cylinder 68 may longitudinally displace tube 29 only when the tube is in one of its angularly displaced material passage positions. When tube 29 has been displaced into sealing engagement with an outlet opening, switch 73 is closed by bar 66. This signals to an automatic control panel that the tube 29 is safely extended into sealing engagement with the selected outlet and that the valve is ready to pass material.

With particular reference to FIG. 2 it will be noted that when valve tube 29 is in either of its material passage positions and between them as well the interior of the valve housing presents no regions wherein the transported material may wedge so that it all passes relatively freely. The diameter of tube 29 is preferably uniform and about equal to the inlet and outlet diameters. The foregoing is true in either direction of material passage through the valve, and in this respect the valve of the invention may be applicable to transport systems in general.

Further, particularly when the valve is used in a pneumatic transport system, by providing a sealed housing at 18 the interior of the housing is always maintained at the vacuum or positive pressure of the system in any position of valve tube 29, and there is no material change in system pressure as the diverter valve is operated to change the material path.

In all of its phases the invention is applicable to diverter valve arrangements wherein the single (inlet or outlet) is connectable to more than two (outlet or inlet) openings.

Moreover in either angular position of valve tube 29 when bulk material is drawn into the enlarged flared inlet end 57 of valve tube 29 such may exert a longitudinal force tending to shift tube 29 toward and augment the pressure tight seal position shown in FIG. 7 where resilient bead 54 is compressed against the end of member 27 and provides a resilient seal. The valve tube flare at 57 is sufficient to permit swing of tube 29 between the full and dotted line positions shown in FIG. 2 without interfering contact with the end of inlet member 25, band 33 being universally flexible to permit these movements without altering its seal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a diverter valve for a pneumatic transport system, a housing having means defining a first opening in one wall and means defining a plurality of adjacent second openings in another wall, said housing being fluid pressure tight except for said openings, valve tube means swingably mounted within said housing for angular and longitudinal displacement by a support structure that has a fixed axis pivot mounting on said housing and a pivotal connection on said valve tube means, said valve tube means being connected at one end flexibly in fluid pressure tight relation to said one opening and having means at its other end for fluid pressure tight connection to one or the other of said second openings, and means for selectively moving said valve tube means within the housing for connecting said other end to one or the other of said second openings comprising a first reversible motor means connected to displace said valve tube means longitudinally for sealed connection or disconnection with a second opening only when said other end of said valve tube means is aligned with one or the other of said second openings, said first reversible motor means being connected at one end to said housing and at its other end to said support structure pivotal connection on said valve tube means, and a second reversible motor means connected to angularly displace said tube about said pivotal connection between positions in operative alignment with one or the other of said second openings only when said valve tube means has been longitudinally disconnected from one or the other of said second openings, said second reversible motor means being connected at one end to said housing and at its other end to said support structure pivotal connection on said valve tube means.

2. In the diverter valve defined in claim 1, said valve tube means being a single tube swingably mounted adjacent said inlet opening.

3. In the diverter valve defined in claim 2, said inlet and outlet openings and said valve tube being of substantially the same material passage diameter.

4. The diverter valve defined in claim 1, wherein the flexible connection between said valve tube means and said housing is a reversely bent annular band that provides for angular displacement of the valve tube means parallel to its axis and substantially longitudinal displacement of said valve tube means in the direction of its axis in either material passage position of said valve tube means.

5. The diverter valve defined in claim 1, wherein fluid pressure motors are provided for effecting said angular and longitudinal displacements of said valve tube means.

6. The diverter valve defined in claim 5, wherein each of said fluid pressure motors has a casing pivoted on said housing and a reciprocable piston rod pivotally connected to said valve tube means.

7. The diverter valve defined in claim 1, wherein said support structure has a fixed pivot axis normal to the longitudinal axis of said valve tube.

8. The diverter valve defined in claim 1, wherein angular displacement of said tube is effected by mechanism including a solenoid operated fluid pressure motor having a control circuit containing switch means responsive to longitudinal disposition of said valve tube means in either of its angular positions.

9. The diverter valve defined in claim 8, wherein a second reversible solenoid operated fluid pressure motor is provided for longitudinally shifting said valve tube means in either of its aligned material passage positions and control switch means for said second motor is provided in said circuit responsive to the angular disposition of said valve tube means for operation in coaction with said first named switch means.

10. The diverter valve defined in claim 1, including slide guide means supporting said valve tube means for substantially universal movement in a plane parallel to its axis.

11. The diverter valve defined in claim 1, wherein said support structure comprises at least one arm pivoted at one end on said housing and pivotally connected at its other end to said valve tube means.

* * * * *